United States Patent Office 2,793,087
Patented May 21, 1957

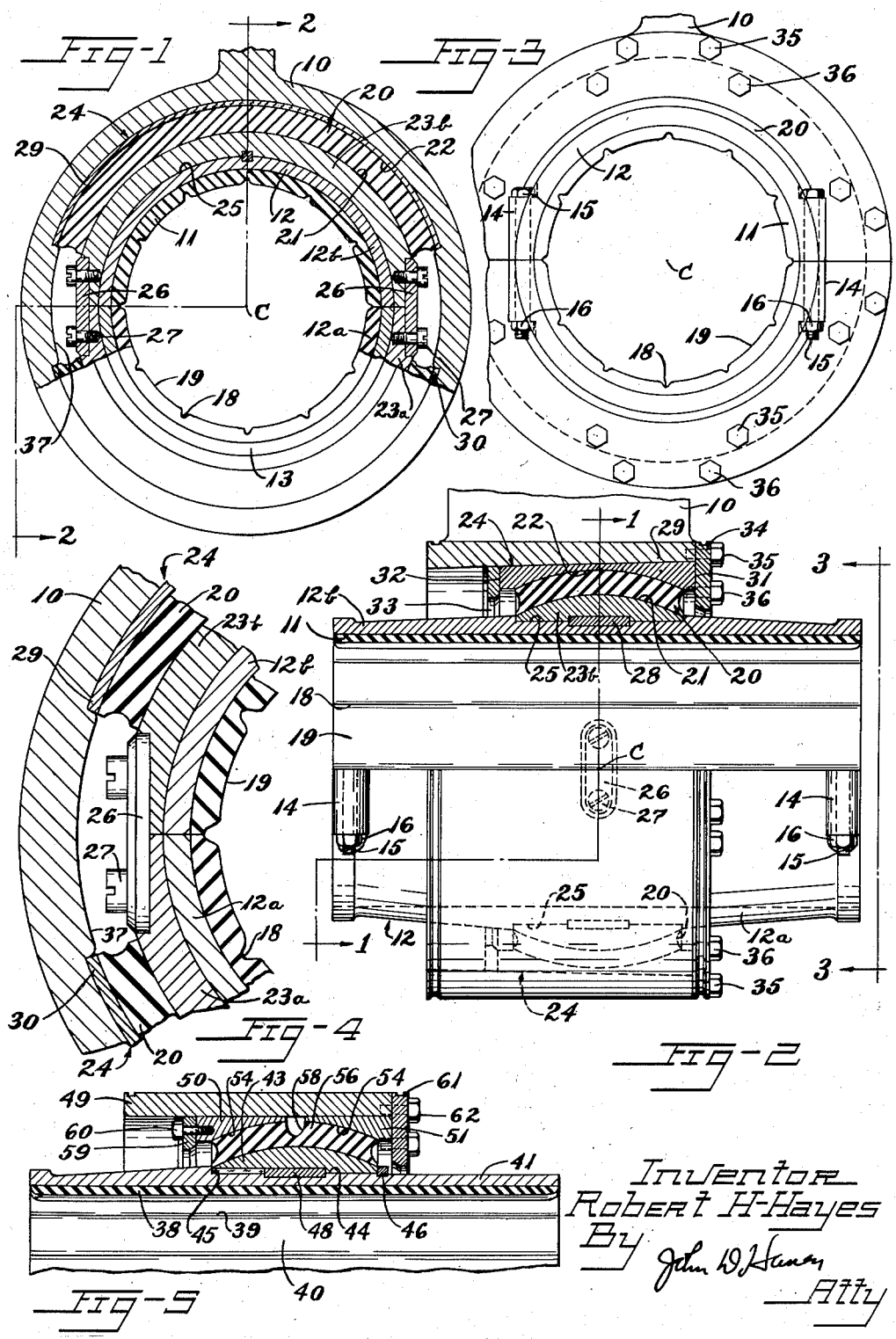

2,793,087

BEARING ASSEMBLY

Robert H. Hayes, Columbia Station, Ohio, assignor to The B. F. Goodrich Company, New York, N. Y., a corporation of New York Application April 14, 1954, Serial No. 423,087

9 Claims. (Cl. 308—26)

This invention relates to a resilient rubber journal bearing assembly particularly adapted for marine propeller shafting and the like.

Resilient rubber bearings have been found especially suitable for marine propeller shafting because they have exceptional resistance to corrosion and to abrasion resulting from the particles of sand, silt and the like which are carried in suspension in the water in which such shafts are normally immersed. Additionally, such bearings advantageously accommodate themselves to relatively small variations in alignment and deflection occurring in the shafting. In certain installations however, the dynamic motion of a shaft may be exceedingly complex because of the diverse nature of the loads to which the shaft may be subjected in service. The weight of the heavy propeller alone subjects the shafts to bending stresses of large magnitude, and unusual and unpredictable patterns of shaft deflection are produced by heavy seas and in different maneuvers of the vessel, all of which tend to greatly accelerate the wearing rate of the bearing. A particularly objectionable characteristic of rubber journal bearings heretofore proposed for this service has been that they have worn rapidly at the mouths of the bearings and that this wear has been accompanied by an objectionable squeal or howl to such an extent that their use has been prohibited in submarines and certain other naval vessels. It is, accordingly, an object of this invention to provide an improved bearing assembly adapted to operate under the foregoing conditions without such objectionable noise or excessive wear.

In the bearing assembly of this invention, the shaft is journaled by a layer of resilient rubber in the bore of a rigid tubular shell which is suspended within a suitable housing by a body of resilient rubber-like material. This supporting body of rubber and the rubber journal layer cooperate to sustain shock, thrust, and torsion loads imposed on the bearing assembly by the shaft and permit tilting of the shell in response to lateral deflections in the shaft in any direction. The supporting rubber body is maintained under radial compression in the assembly and is shaped such that loads tending to tilt the shell, thrust loads, or torsional loads are each opposed by the elastic deformation of the rubber body in essentially a shearing action. This rubber body further functions to dampen shocks and vibration and to insulate the hull from these effects.

The invention will be further described with reference to the accompanying drawings which illustrate certain preferred bearing assemblies made in accordance with and embodying this invention.

In the drawings:

Fig. 1 is a view of one end of a bearing assembly mounted in a supporting structure, certain parts being broken away (see line 1—1 in Fig. 3) to show details of the construction;

Fig. 2 is a view, partly in side elevation and partly in section taken along the line 2—2 of Fig. 1;

Fig. 3 is an end elevational view of the opposite end of the supported bearing assembly shown in Fig. 1 (see line 3—3 of Fig. 2);

Fig. 4 is a detail view partially in section showing the manner in which portions of the assembly engage the housing in which the assembly is mounted; and Fig. 5 is a fragmentary longitudinal section through a modified form of the invention.

In the form illustrated in Figs. 1-3, the bearing assembly is installed in an annular housing 10 of a support member such as a shaft hanger of a marine vessel, a stern tube, or the like, which supports a propeller shaft immersed in water. The bearing assembly comprises a bearing surface layer 11 of resilient rubber secured to the interior of a rigid inner metal shell 12. The rubber bearing layer is preferably adhered to the bore of the inner shell by a vulcanized bond but may be otherwise secured to the bore of the shell in other ways known to this art. The inner shell 12 is tubular and is longitudinally divided into two complementary generally semi-cylindrical shell sections 12a and 12b, and the rubber bearing layer 11 is correspondingly divided to facilitate the manufacture and installation of the bearing. To fasten the shell sections together, the outer ends of the lower shell section 12a have external flanges 13 which are provided with integral bosses 14 that mate with corresponding flanges and bosses on the upper shell section 12b to receive bolts 15 which pass through the bosses and which are threaded into nuts 16. The bearing surface of the layer 11 is provided with circumferentially-spaced, axially-extending channels or grooves 18 which define axially-extending lands 19 forming bearing surfaces for rotatably supporting a shaft journal (not shown). The channels or grooves 18 provide passages for circulation of water lengthwise through the inner shell to lubricate the bearing surface and to wash away any sand, silt or other solid material which may have entered the bearing end collected in the grooves.

The shell 12 together with the resilient rubber bearing layer 11 is supported within the annular housing 10 by a pair of relatively narrow rubber bodies 20, one extending circumferentially about the lower shell section 12a and the other extending circumferentially about the upper shell section 12b at about the midpoint intermediate the ends of the respective shell sections. Each of the rubber bodies 20 extends through less than 180° of arc about its respective shell section and is of uniform thickness. They are disposed between and vulcanized to each of a pair of concentric frusto-spherical surfaces 21 and 22 formed, respectively, on concentric annular collars 23 and 24 (see Fig. 2) which encircle the medial portion of the inner shell 12. The radii of the surfaces 21 and 22 are centered at a common point C upon the axial center line of the inner shell 12. The projection of these frusto-spherical surfaces on the shell 12 is equal to about one-third the axial length of the shell. (The term "frusto-spherical" as used herein refers to the surface or portions thereof of a sphere intermediate and bounded by a pair of spaced planes separated by and each parellel to a great circle of the sphere.)

The frusto-spherical surface 21 has a convex contour and is the outer peripheral surface of the collar 23. This collar is preferably formed of metal and its inner periphery fits into a complementarily-shaped groove 25 extending circumferentially about the exterior of the inner shell 12 substantially medially of the ends of the shell. The radial sides of the grooves 25 closely abut the end shoulders of the collar 23 to prevent relative axial movement between the collar and the shell. The collar 23 is axially divided into two semi-annular collar sections 23a and 23b, the collar section 23a embracing the lower shell section 12a and the collar section 23b embracing the upper shell section 12b. The ends of these collar sections are removably connected together by anchor straps 26 and cap screws 27 (Fig. 1). Rotation of the collar 23 relative to the inner shell 12 is precluded by a key 28 which mutually engages suitable keyways in the collar 23 and in the shell 12 and which extends in a direction parallel to the axis of the shell.

The collar 24 concentrically surrounds the collar 23 in radially spaced relation and is formed with two substantially semicylindrical metal members 29 and 30. The previously-mentioned frusto-spherical surface 22 constitutes the inner periphery of this collar and has a concave contour directed toward the convex surface 21 of collar 23. The members 29 and 30 of the collar 24 each extend through less than 180° of arc and are coextensive with the length of their respective rubber bodies 20 as will be apparent from Fig. 1. The gap between the opposing ends of the members 29 and 30 enables the straps 26 to be assembled and also permits regulation of the compression in the rubber when the assembly is installed. Also, in manufacturing these parts, each section of the outer collar 24 is free to shift toward its corresponding section of the inner collar 23 as a result of shrinkage of the bodies 20 upon cooling after vulcanization.

The exterior peripheral surface of the outer collar 24 (i. e., the exterior surface of the members 29 and 30) is gradually tapered from a larger diameter adjacent one side face 31 to a smaller diameter at the other side face 32. The bore of the housing 10 into which the bearing assembly is received has a complementary taper as indicated in Fig. 2. Consequently, upon installation of the bearing structure in the housing 10, the engagement of the complementarily tapered surfaces on the bore and bearing assembly produces a radial compression of the rubber bodies 20. The rubber is radially compressed to the extent that at least some compressive stress is present in the rubber bodies for any distortion which can be applied to the rubber bodies. In other words, the rubber bodies 20 are precluded from being stressed in tension in a radial direction with the result that their resistance to fatigue is good. The rubber bodies 20 are preferably compressed to a thickness of about twice the thickness of the bearing layer 11 when the bearing assembly is properly mounted in the housing 10. The extent to which the outer collar 24 may be urged into the bore of the housing is limited by providing a radial flange or ring 33 (see Fig. 2) within the bore against which the inner face 32 of the bearing assembly may abut. Displacement of the bearing from this position is prevented by a pair of semi-annular plates assembled to form an annular ring 34 connected with the housing 10 by cap screws 35 with its inner edge overhanging and abutting the adjacent side face 31 of the outer collar 24. Additionally the ring 34 is secured to the end face 31 of the outer collar by cap screws 36 (see Fig. 3). The bore of the housing 10 is provided with longitudinally-extending projections or bosses 37 (see Fig. 4), which are positioned to interlock between the adjacent longitudinal edges of the members 29 and 30 of the outer collar to prevent relative rotation between the bearing assembly and the hanger or housing.

Both the exposed axial and arcuate edges of the rubber bodies 20 have a concave contour which precludes these faces from wrinkling when the rubber bodies are compressed during assembly or when they are stressed in service. The rubber compound for both the bearing layer 11 and the bodies 20 is preferably oil-resistant. The metal elements of the assembly are preferably naval brass, Monel or other corrosion-resistant metal.

A bearing of the type here illustrated and described may be assembled into an integral structure and then sleeved over the end of a shaft with which the bearing is to be employed, alternatively this bearing may be assembled around the shaft as two separate halves after which the anchor straps 26, cap screws 27, and the bolts 15 are inserted thus uniting the bearing around the shaft. Thereafter, the bearing is moved along the shaft into the housing 10 and secured therein by application of the ring 34. The two-part construction permits the bearing to be changed easily without disassembling the propeller, etc.

A shaft journalled in the bearing is lubricated by water in which the shaft is immersed. The water is free to flow along the channels or grooves 18 to provide a lubricating film between the shaft and the lands 19 on which the shaft rides. In this bearing assembly a proper lubrication film can be maintained between the journal under almost any type load (within the appropriate design limits) that the shaft may impose on the bearing. Due to the frusto-spherical shape of the rubber bodies 20 and the location of the bodies 20 intermediate the ends of the shell, the inner shell is particularly sensitive for tilting with the shaft in response to bending of the shaft relative to its normal position of alignment, the tilting movement producing a pure shearing stress in the rubber bodies. A further advantage of this bearing assembly is that it is also able to sustain appreciable thrust loads imposed upon the shaft since the inner shell 12 with the bearing layer 11 is free to shift longitudinally through the housing with thrust movements of the shaft. This type movement is also resisted by essentially shearing stresses in the rubber, although because of the spherical shape of the rubber bodies 20 some unobjectionable compression will additionally occur. The rubber bodies 20 additionally cooperate with the bearing layer to protect the bearing layer from loads tending to crush the lands 19 by permitting the shell 12 and the layer 11 to rotate with the shaft a limited extent, thereby stressing the rubber bodies 20 in torsion, so that such high pressures may be relieved and a proper lubrication film reestablished. It may, therefore, be seen that regardless of how the load is imposed by the shaft on the bearing layer, the rubber bodies 20 are stressed essentially in shear to accommodate a major proportion of such a load. Also, the rubber bodies 20 provide for effectively insulating the hull of the vessel from pounding or other shock type loads to which the bearing assembly is subjected and which greatly augment the normal rotational vibrations caused by the shaft.

A modified embodiment of the invention is illustrated in Fig. 5 of the drawings. In this form of the invention the bearing layer or surface 38 is formed of resilient rubber and provided with axially-extending circumferentially-spaced grooves 39 forming lands 40 similar in nature and construction to the grooves and lands of the bearing shown in Figs. 1 to 3. In the instant embodiment, however, the bearing layer 38 is circumferentially continuous or integral and is united with the interior surface of a tubular sleeve or shell 41 which is also of one-piece construction. A convex frusto-spherical surface 42 may be machined directly upon the exterior surface of the shell 41 but as shown in Fig. 5 this surface is formed on a separate annular collar 43, the inner surface of which is substantially cylindrical and has a sliding fit on a correspondingly-shaped exterior surface 44 of the shell 41. This surface 44 is provided around the shell by machining a portion of the exterior thereof to a smaller diameter than the remainder of the sleeve thus providing a radially extending shoulder 45 intermediate the ends of the sleeve against which one side face of the collar 43 abuts. The collar 43 is held in this position by a snap ring 46 disposed in a circumferential groove on the reduced diameter portion of the shell adjacent the other side face of the collar. Rotation of the collar 43 relative to the shell 41 is prevented by a key 48.

In this form of the bearing assembly the inner shell 41 is supported within a housing 49 by two annular rings 50 and 51, each of which is circumferentially continuous and is provided on its inner surface with a portion of a concave frusto-spherical surface 54 which is concentric with the convex surface 42 on the outer periphery of the collar 43. The annular rings 50 and 51 are axially spaced from each other and to the surfaces 54 of these rings there is vulcanized a circumferentially continuous annular sleeve 56 of resilient deformable rubber. The inner periphery of the rubber sleeve 56 is vulcanized to the surface 42 of the collar 43. The portion of the outer periphery of the rubber sleeve 56 intermediate the rings 50 and 51 has a circumferential groove 58 molded into it in order to permit the rubber sleeve to be relatively easily compressed upon mounting of the bearing assembly. The outer periphery of each of the rings 50 and 51 is preferably cylindrical and is adapted to be received in a cylindrical bore of the housing 49. In this embodiment of the invention, compression of the resilient rubber sleeve 56 is effected by axial movement of the annular members or rings 50 and 51 towards each other within the bore which is facilitated by the groove 58 in the rubber sleeve 56.

Installation of a bearing assembly of the type shown in Fig. 5 may be effected by first assembling the shell 41 with the collar 43, the resilient rubber sleeve 56, and rings 50 and 51 to provide a unitary structure after which the bearing assembly is then sleeved over the shaft. The assembly is then slid along the shaft into the bore of the housing 49. The position of the bearing assembly within the housing is determined by providing a projection or ring 59 within the housing against which one radial face of the ring 50 may abut and to which the ring 50 is fastened by cap screws 60 to prevent relative rotational displacement between tthe bearing assembly and the housing. In the initial position of the bearing assembly with the ring 50 engaging the ring 59, the other annular ring 51 projects outwardly beyond the adjacent edge of the housing 49. To complete the installation the ring 51 is then urged into the housing axially toward the ring 50 to place the rubber sleeve 56 under compression and close or reduce the relaxed width of the groove 58. The ring 51 is then retained in this position by a collar 61 which is secured to the housing by cap screws 62. The extent of compression of the rubber sleeve 56 is determined by the amount of tightening of the screws 62.

The bearing illustrated in Fig. 5 exhibits substantially the same advantages and operational characteristics as the bearing illustrated in Figs. 1 to 3. Hence, its bearing surface or layer 38 is relieved from the excessive deforming forces to which such layers have heretofere been subjected with the result that the lands 40 tend to retain their optimum shape for efficient functioning as a bearing surface thereby reducing wear and noise which has heretofore been produced in installations where radial loads or bending forces on the bearings have been of large magnitude.

Variations of the structure disclosed may be made within the scope of the appended claims.

I claim:

1. A bearing assembly for marine propeller shafting and the like comprmising an inner rigid metal shell having a generally cylindrical bore, a resilient rubber bearing layer on the bore of said shell, a collar circumferentially encircling the shell intermediate the ends of the shell and having a peripheral convex frusto-spherical surface, a circumferential groove in said shell to receive the collar, rigid shell-supporting members spaced radially from said collar each including a concave surface directed toward and concentric about said convex surface, a body of resilient rubber-like material interposed between and coextensive with said convex and concave surfaces and adhered to each of said surfaces throughout the arcuate extent of said surfaces, a housing having a bore to receive said supporting members, and means for maintaining said rubber body under radial compression within said housing, and means for engaging the supporting members with said housing.

2. A bearing assembly for marine propeller shafting and the like comprising a pair of generally semi-cylindrical mating metal shell sections fitting together to define a tubular shell, a layer of resilient rubber bearing material on the interior of each shell section, a collar circumferentially surrounding said shell sections at the medial portion of the shell intermediate its ends, a groove in the exterior of the shell to receive said collar, means for securing the collar against rotation relative to the shell, the collar including two semi-annular sections having axial edges terminating adjacent axial edges of the shell sections, means for securing the axial edges of one of the collar sections with corresponding edges of the other collar section, each collar section having an exterior peripheral surface of convex frusto-spherical shape extending from said means for securing the axial edges of the collar sections on one side of the shell to the corresponding securing means on the opposite side of the shell, a body of resilient rubber-like material of uniform thickness vulcanized to each convex surface, each body of rubber having a width equal to the axial extent of said surface and being shorter in length than the peripheral extent of said convex surfaces so that the axial edges of each rubber body terminate short of the axial edges of its respective collar segment to provide access to said collar securing means, and a pair of rigid arcuate members each embracing a rubber body and coextensive in length with said rubber bodies, the rigid members including a concave frusto-spherical surface concentric with said convex surface and to which the rubber body is vulcanized, and axial end faces on said arcuate members substantially coinciding with the end faces of said rubber bodies, the outer periphery of said arcuate members being receivable in the bore of a housing to urge the arcuate members toward the shell and maintain said rubber bodies under radial compression, means for securing said arcuate members to said housing, and means in the bore of the housing to engage said axial end faces of the arcuate members to prevent rotation of the bearing assembly relative to the housing.

3. A bearing assembly for marine propeller shafting and the like comprising a pair of generally semi-cylindrical mating shell sections fitting together to define a tubular shell, a layer of resilient rubber bearing material on the interior of each shell section, a collar circumferentially surrounding said shell sections at the medial portion of the shell intermediate its ends, means for securing the collar against rotation and axial displacement relative to the shell, the collar having on the periphery thereof a surface of convex frusto-spherical contour extending concentrically about the shell, rigid shell-supporting members spaced radially from said collar and having a concave surface directed toward and concentric with said convex surface of the collar, a body of resilient rubber-like material interposed between and coextensive with said surfaces for universally supporting said shell relative to said supporting members, the outer periphery of said rigid members being receivable in a housing, and said rigid supporting members and said collar mutually cooperating to maintain said rubber body in radial compression.

4. A bearing assembly for marine propeller shafting and the like comprising a pair of generally semi-cylindrical mating rigid shell sections fitting together to define a tubular shell, a layer of resilient rubber bearing material on the interior of each shell section, a collar circumferentially surrounding said shell sections at the medial portion of the shell intermediate its ends, a groove in the exterior of the shell to receive said collar, means for securing the collar against rotation relative to the shell, the collar including two semi-annular sections, means for securing the axial edges of one of the collar sections with corresponding edges of the other collar section, each collar section having an exterior peripheral surface of convex frusto-spherical shape extending from said means for securing the axial edges of the collar sections on one side of the shell to the corresponding securing means on the opposite side of the shell, a body of resilient vulcanized rubber-like material conforming to the contour of each said convex surface, and a pair of rigid arcuate members each embracing a rubber body and substantially coextensive therewith, said rigid members including a concave frusto-spherical surface concentric with said convex surface and the rigid members being adapted to cooperate with said convex collar surfaces to maintain said rubber bodies under radial compression.

5. A bearing housing having a central bore adapted to receive a shaft extending through the bore, a rigid tubular shell surrounding the shaft within said bore, a resilient rubber bearing layer between the shaft and said shell, a collar circumferentially encircling the shell within said bore intermediate the ends of the shell and the collar having a peripheral convex frusto-spherical surface, means for securing the collar against displacement relative to the shell, rigid shell-supporting members within said housing bore spaced radially from said collar and each including a concave surface directed toward and concentric about said convex surface, a body of resilient rubber-like material interposed between and coextensive with said convex and concave surfaces and maintained by said supporting members in cooperation with said housing under substantial radial compression, and means for engaging the supporting members to said housing.

6. A bearing assembly comprising an inner rigid tubular shell having a bore to receive a shaft extending therethrough, a resilient rubber bearing layer within said bore for journaling the shaft, a collar circumferentially encircling the exterior of said shell intermediate the ends of the shell, said collar having a peripheral convex frusto-spherical surface, means for securing said collar against displacement relative to the shell, rigid shell-mounting means surrounding said collar and including members defining a concave frusto-spherical surface spaced radially from and concentric with said convex collar surface, and a body of resilient rubber material interposed between and coextensive with said surfaces, said mounting means and said collar cooperating to maintain said body in radial compression and said body being adapted to support said shell for universal movement relative to said mounting means by elastic deformation of said body in essentially shear.

7. A bearing assembly in accordance with claim 6 in which said shell-mounting means includes a plurality of arcuate circumferentially discontinuous support members cooperating to define said concave surface, said members being adapted for circumferential contraction to compress said rubber body.

8. A bearing assembly in accordance with claim 6 in which said shell-mounting means includes a pair of axially-spaced apart annular support members encircling said collar and cooperating to define said concave surface, said members being adapted for axial displacement toward each other relative to said shell to compress said rubber body.

9. In a bearing assembly, an inner rigid tubular shell having a bore for journaling a shaft extending therethrough, a collar circumferentially encircling the exterior of said shell intermediate the ends of the shell, said collar having a peripheral convex frusto-spherical surface, means for securing said collar against displacement relative to the shell, rigid shell-mounting means surrounding said collar and including members defining a concave frusto-spherical surface spaced radially from and concentric with said convex collar surface, and a body of resilient rubber material interposed between and coextensive with said surfaces, said mounting means and said collar cooperating to maintain said body in radial compression and said body being adapted to support said shell for universal movement relative to said mounting means by elastic deformation of said body in essentially shear.

References Cited in the file of this patent
UNITED STATES PATENTS

| 1,025,884 | Schmitt | May 7, 1912 |
| 1,067,892 | Walters | July 22, 1913 |
| 1,797,223 | Annis | Mar. 24, 1931 |
| 1,990,016 | Alden | Feb. 5, 1935 |
| 2,295,139 | Topanelian | Sept. 8, 1942 |